UNITED STATES PATENT OFFICE.

F. MARQUARD, OF RAHWAY, NEW JERSEY.

IMPROVEMENT IN THE MANUFACTURE OF WHITE RUBBER.

Specification forming part of Letters Patent No. 51,331, dated December 5, 1865; Reissue No. 2,180, dated February 20, 1866.

*To all whom it may concern:*

Be it known that I, FRANK MARQUARD, of Rahway, Union county, State of New Jersey, have invented certain new and useful improvements in the method or process of treating india-rubber, gutta-percha, and other similar gums to harden them, so as to imitate ivory, pearl, coral, enamel, woods of various kinds, and other substances used in the arts and manufactures; and I do hereby declare that the following is a full description of the same.

The object of my invention is to obviate the objections to the practical operations of a certain invention made by Engelhard and Haveman, and patented November 22, 1859, for bleaching india-rubber or gutta-percha by the use of chlorine gas and alcohol, which objections are, first, that where india-rubber, gutta-percha, or other similar gums are bleached by chlorine gas it impairs, if not entirely destroys, the tenacity of the gum when not entirely removed therefrom as soon as the bleaching operation is over; second, that owing to the slight affinity of alcohol for absorbing chlorine gas it is very difficult to wash or free the gum from the chlorine, and to do so at all requires a very large quantity and a constant change of volume to take up all the chlorine; third, that owing to the quantity of alcohol required to wash the gum free from the chlorine, and the insensible evaporation of the alcohol during the process of washing, makes the cost of manufacturing goods by this process an insurmountable objection to its general adoption, though theorectically capable of obtaining the result aimed at by the inventors. My invention therefore is to overcome these objections, as well as to improve and cheapen the manufacture of hard rubber, gutta-percha, or other similar gums, which I accomplish by the following operations:

First, I take about two pounds of the pure india-rubber or gutta-percha or other similar gum and dissolve it in about thirty-two pounds of chloroform. When the gum has been thoroughly dissolved in any properly-constructed digester, I next charge the solution with chlorine gas until the gum has been thoroughly bleached, which I ascertain by inspection and testing. After the operation of bleaching the gum, I remove the solution to a boiler, or other suitable vessel prepared for the purpose, and having an agitator in it, and there subjected to a washing process with hot water, until the gum is entirely freed from the chlorine. From the greater affinity of chlorine for hot water than it has for alcohol, it will be obvious that the gum will be washed in much less time, and at the same time more thoroughly, than if alcohol were used, besides saving the entire cost of alcohol in the process, as well as the extra hazardous character of the material, as adding to the insurance risk on the buildings where such manufactures are carried on. After the process of washing the gum in the hot water, I next subject the solution to a distilling process, though this operation may be carried on simultaneously with the washing process by raising the temperature of the water to about 176° Fahrenheit grade—the evaporating-point of chloroform. The object of this is to distil or evaporate the chloroform from the solution of the gum and collect it in a suitable condenser, so that it can be used over again as a solvent. It will be obvious that this could not be effected if alcohol were used as a wash to free the gum from the chlorine, first, because the alcohol and chloroform are of somewhat similar properties, and therefore could not be separated by any ordinary distilling operation; such as could be used economically in a large manufacturing concern; second, because of the great risk attending such an operation; and it will also be obvious that not only the cost of the alcohol, but also the loss of the chloroform as a solvent, may be added to the other objections of impracticability of the manufacture of hard rubber by a process using chlorine gas and alcohol to bleach and wash the gum. The product obtained from the distillation of the gum is then strained, pressed, and dried. It is then redissolved in a small quantity of chloroform or other solvent to a consistency of a thick paste, and then mixed with finely-prepared pure phosphate of lime or carbonate of zinc in such proportions as to give a body to it, and having the appearance of dampened meal, in which condition it is subjected to pressure in hot molds, to give coherence to the mass or compound and to expel the excess of chloroform. With a sufficient degree of pressure this is effected at once, and the compound or hardened rubber or other gum may be put in the lathe, or by other mechanism worked and shaped into all manner of forms and devices.

It will be obvious that articles thus made would be white; but to make articles to imitate coral, pearl, enamel, and various kinds of woods and other substances it will be necessary to mix any of the various colored dry pigments with the compound at the same time of mixing the phosphate of lime with it.

Having now described my improvements in treating india-rubber, &c., I will proceed to set forth what I claim and desire to secure by Letters Patent of the United States.

1. The method or process of treating india-rubber, gutta-percha, or other similar gums with hot water for the purpose of washing them after they have been previously bleached with chlorine gas, substantially as hereinbefore set forth.

2. The method or process of treating india-rubber, gutta-percha, or other similar gums by distillation after the gum has been bleached with chlorine gas, for the purposes hereinbefore set forth.

3. The method or process of treating india-rubber, gutta-percha, or other similar gums that have been previously bleached with chlorine gas and washed and distilled, as hereinbefore set forth, by redissolving it in chloroform or other solvent and mixing with it phosphate of lime, and subjecting the compound to pressure in hot molds to harden and solidify it, for the purposes described.

FRANK MARQUARD.

Witnesses:
L. B. HOLLENBACK,
C. L. BARRITT.